Feb. 8, 1966  T. D. HOOPER  3,233,709
ELECTROMAGNETIC CLUTCH-BRAKE
Filed Dec. 6, 1961  2 Sheets-Sheet 1

INVENTOR.
THOMAS D. HOOPER
BY John F. A. Earley

Feb. 8, 1966  T. D. HOOPER  3,233,709
ELECTROMAGNETIC CLUTCH-BRAKE
Filed Dec. 6, 1961  2 Sheets-Sheet 2

INVENTOR.
THOMAS D. HOOPER
BY
ATTORNEY

United States Patent Office 3,233,709
Patented Feb. 8, 1966

3,233,709
ELECTROMAGNETIC CLUTCH-BRAKE
Thomas D. Hooper, Merchantville, N.J., assignor, by mesne assignments, to Litton Industries, Inc., Beverly Hills, Calif., a corporation of Delaware
Filed Dec. 6, 1961, Ser. No. 157,524
4 Claims. (Cl. 192—18)

This invention relates to improvements in a clutch, and more particularly concerns a magnetic clutch and a magnetic clutch-brake of the type used in guided missiles, computers, and miniature servo systems.

One of the problems of magnetic clutch operation arises because the clutch cannot be engaged or disengaged instantaneously. If the time period required to connect or disconnect the input and output shafts by means of the clutch is long, the output shaft may lose its index with relation to the input shaft. Accordingly, information added to or subtracted from the input shaft is not precisely transferred to the output shaft. Since the timing of the operation of a magnetic clutch is reckoned from the instant that the magnetic field of the clutch is activated, any time lag due to mechanical motion of the clutch in engaging or disengaging, decreases the timing accuracy between the input and output shafts and may make uncertain the sequence of operations controlled by these shafts.

Another problem of magnetic clutches is caused by the manner in which the clutch faces make contact during engagement or disengagement. If the clutch faces are not parallel, or if they do not remain parallel during the engaging or disengaging operation, or if the distribution of spring pressure over a clutch face is uneven, the clutching action is a gradual one and a period of time passes before the clutch faces are fully engaged.

Another disadvantage of this gradual engagement of the clutch faces is that it results in a gradual pickup of torque, and this cause slippage between the clutch faces (and a lag between the input and output shafts), because not sufficient torque can be transmitted through the small surface areas of the clutch faces initially in contact when the clutch faces are not precisely parallel.

Accordingly, it is an object of this invention to overcome the aforementioned problems and disadvantages.

It is another object of this invention to provide a clutch wherein the clutch faces make or break connection quickly.

It is another object of this invention to provide a clutch wherein the clutch faces are in precise parallelism, and which maintain said parallelism during the clutching and declutching operation.

It is another object of this invention to provide a clutch wherein there is no gradual pickup of torque between the input and output shafts, and there is no slippage between the clutch faces.

It is another object of this invention to provide clutch faces which are in parallelism and are perpendicular to the axes of the input and output shafts so that the gap between the clutch faces is small, and the time period required to bring the clutch faces together across that gap is correspondingly small.

It is another object of this invention to provide a clutch which is movable axially, but which does not twist or turn while so moving.

It is another object of this invention to provide a clutch element which assures uniformity of pressure between clutch faces and between brake faces, and which assures parallelism of clutch and brake faces at all times.

Other objects and advantages of the invention, including its simplicity and economy, as well as the ease with which it may be adapted to existing equipment, will further become apparent hereinafter and in the drawings, in which.

Figure 2:
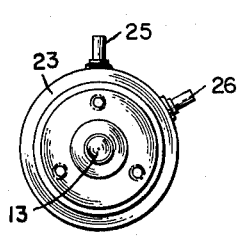
FIG. 2 is an end view of the assembly shown in FIG. 1.
Figure 1:
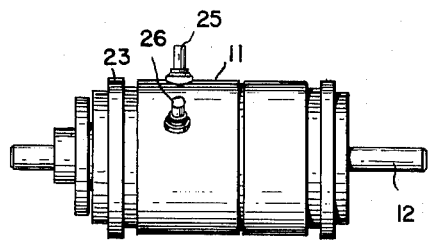
FIG. 1 is a view in side elevation of a magnetic clutch-brake assembly constructed in accordance with this invention.
Figure 5:
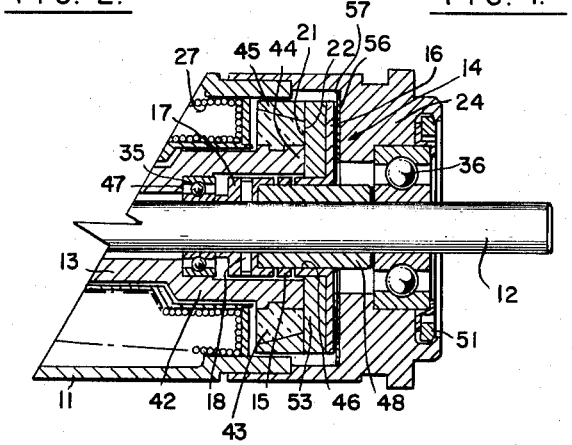
FIG. 5 is a partial view in cross section showing the clutch in its engaged position.
Figure 4:
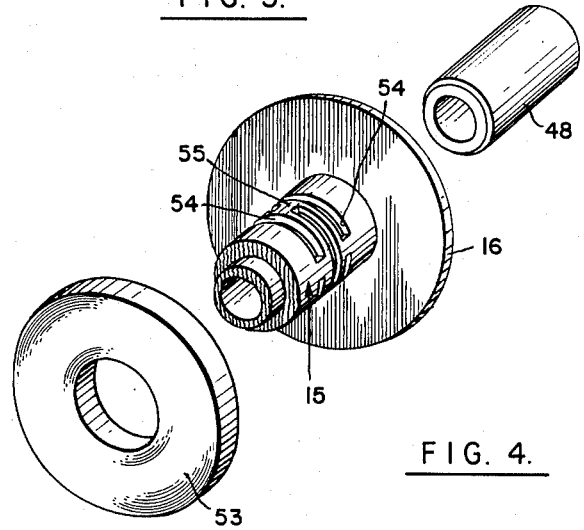
FIG. 4 is an exploded view in perspective and shows the movable clutch element of the invention.
Figure 3:
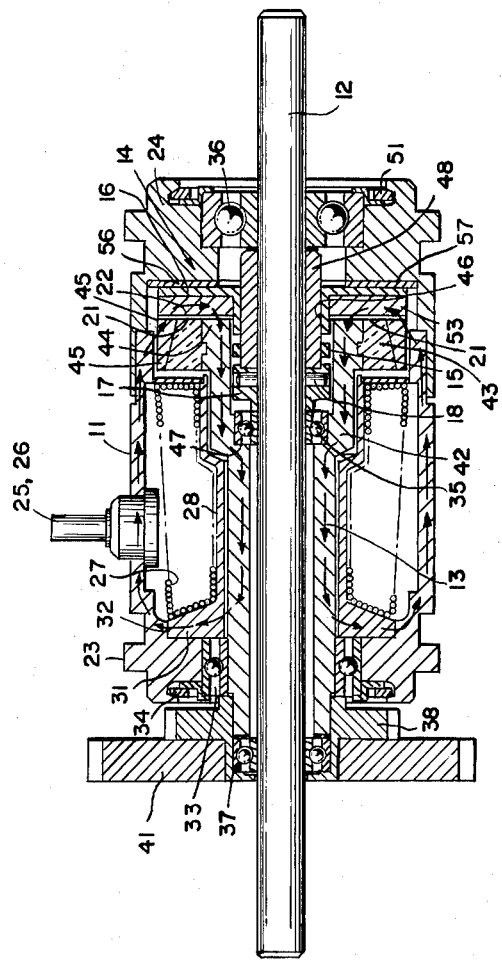
FIG. 3 is a longitudinal section on an enlarged scale of the assembly shown in FIG. 1, and illustrates the clutch in its braking position.

Although specific terms are used in the following description for clarity, these terms are intended to refer only to the structure shown in the drawings and are not intended to define or limit the scope of the invention.

Turning now to the specific embodiment of the invention selected for illustration in the drawings, there is shown a magnetic clutch-brake assembly which includes a housing having a cup-like casing 11, an output shaft 12 rotatably supported within casing 11, a tubular input shaft 13 rotatably mounted on output shaft 12, a clutch element 14 including an integral generally cylindrical spring 15 with a disk 16 at one end and with the other end 17 anchored to output shaft 12 by pin 18, a clutch face 21 formed on the end of input shaft 13, and a clutch face 22 on clutch element 14 adapted to frictionally engage clutch face 21 of input shaft 13.

Casing 11 is made of magnetic material, such as steel, and provides a magnetic path as well as a cover for the magnetic clutch-brake assembly. Casing 11 includes an end 23 which is used to mount the assembly and is accordingly machined to standard configuration similar to that used in synchros. The open end of casing 11 is closed by an end cap 24, generally made of non-magnetic material, which is force fitted over the open end of casing 11. The exterior of end cap 24 is also machined to standard configuration for mounting.

Electrical leads 25, 26 are mounted on casing 11 and are connected with a field coil 27 inside casing 11 which is wound around a spool 28 of magnetic material. One end 31 of spool 28 is force fitted into a recess 32 in end 23 of casing 11.

Input shaft 13 is rotatably supported by a bearing 33 (which is held in place by a split ring 34), and a bearing 35. Output shaft 12 is rotatably supported in end cap 24 by a bearing 36, is rotatably supported at its middle portion by bearing 35, and is rotatably supported at its other end by a bearing 37 which is positioned within an input gear mount 38 that is affixed to the end of input shaft 13. An input gear 41 is mounted on input gear mount 38.

Tubular input shaft 13 is provided with a bell-shaped end portion 42 that has a ring 43 of non-magnetic material mounted on its end. Ring 43 may be made of glass, aluminum, or brass, for example, and acts as a magnetic insulation, and also a radial separation, between inner section 44 (of magnetic material) and outer section 45 (of magnetic material) of shaft clutch face 21.

Clutch element 14 is provided between spring 15 and disk 16 with a hub 46 which is long enough to insure non-rocking of disk 16 so that clutch face 22 is always perpendicular to the axis of output shaft 12 and parallel to clutch face 21 of input shaft 13. End 17 of spring 15 abuts bearing 35 which in turn abuts shoulder 47 of tubular input shaft 13. Accordingly, end 17 of clutch element 14 is prevented from moving axially in one direction relative to shaft 13 by bearing 35, and in the other direction by bronze bushing 48, and a bearing 36 (held in its seat by locking ring 51).

Disk 16 has mounted thereon a magentic ring 53, one surface of which forms clutch face 22.

Accordingly, clutch face 21 of shaft 13 is formed by magnetic inner section 44, non-magnetic ring 43, and outer magnetic section 45 which are finished in one operation to provide clutch face 21 with an even contact surface which is perpendicular to the axis of the assembled clutch-brake unit.

Clutch face 22 is machined after ring 53 is press-fitted onto the hub 46 to insure that clutch face 22 is perpendicular to the axis of the assembled unit.

Clutch element 14 is preferably machined from solid stock of beryllium copper, so that its grain structure (and therefore stress and strain) and strength characteristics may be predetermined and kept uniform, and its dimensions may be controlled very accurately. Spring 15 of clutch element 14 is of circular cross section and has its grain running perpendicular to its axis. Spring 15 has spaced rows of aligned circumferential slots 54 formed therein, with bridges 55 separating the slots 54 of each row, and with each bridge 55 being located 90° away from a bridge 55 of an adjacent row.

When clutch element 14 is compressed along its axis, spring 15 of the present invention is compressed without any torsion or twisting. Compare this with a helical spring, for example, which always produces an undesirable rotary or twisting motion when compressed.

The inside diameters of spring 15 and hub 46 are carefully machined to form a sliding fit with the outside diameter of bronze bushing 48 (preferably made from sintered bronze that is oil impregnated for lubrication). A brake face 56 is formed on the other side of disk 16, and a brake face 57 is formed on end cap 24 and covered with a braking material. Brake face 57 is adapted to be frictionally engaged by disk brake face 56 when field coil 27 is deenergized. It will be realized that the braking material may cover disk brake face 56, instead of casing brake face 57.

When the magnetic clutch-brake assembly is energized by field coil 27, the magnetic lines of force (as indicated by the arrows) make a complete loop through the magnetic material, as follows: casing 11, outer magnetic section 45, the gap between clutch faces 21 and 22, the gap between clutch faces 22 and 21, inner section 44, tubular input shaft 13, end 31 of spool 28, and back to casing 11.

In operation, when the clutch brake assembly is deenergized, brake face 56 of disk 16 is pressed by the force of spring 15 against the friction material of casing brake face 57. Thus, output shaft 12 is held stationary. Spring 15 is loaded or compressed enough to hold shaft 12 stationary at the maximum torque expected from feed back.

When field coil 27 is energized through electrical leads 25, 26, it develops a magnetic field which closes the magnetic loop and brings clutch faces 21 and 22 together.

In practice, the gap between clutch faces 21 and 22 has been closed and the clutch faces brought together in three milliseconds, and satisfactory results have been obtained, where the gap between clutch faces 21 and 22 has been .003 to .005 inch in a size 5 (.5 inch diameter) clutch-brake unit. The clutch gap can be made this small because of the elimination by this invention of any cocking of the clutch faces, and elimination of any but axial movement of those faces. Another advantage of the invention is that the clutch operates with less magnetizing energy because clutch face 22 does not have to move a great distance, and spring 15 does not have to be compressed very much.

The structure of clutch element 14 enables predetermination of the properties wanted in the spring action, unlike winding a helical spring around a mandrel, wherein one coil is always higher than an adjacent coil. Even with a washer, compressing a helical spring gives it a twisting motion. Another advantage, of orienting the grain structure of the metal in clutch element 14 so that it is perpendicular to the axis of the assembly, is that this arrangement places the grain structure for best flex action.

The clutch and brake faces constructed in accordance with the present invention are parallel and are perpendicular to the axis of the assembly, so that the gaps between the clutch faces and the brake faces are very small. Accordingly, the time required to move this small gap distance to make contact between the faces is reduced to a minimum.

The action of spring 15 of clutch element 14 in providing a uniform pressure gradient over the entire clutch face 22 and brake face 56 assures uniform pressure against shaft clutch face 21 or casing brake face 57. This means that input shaft 13 is connected to output shaft 12 in a positive and uniform manner at the instant of contact between clutch faces 21 and 22, without slippage or dragging. The clutch element of the present invention assures rapid and positive action in engaging and in disengaging.

It is to be understood that the form of the invention herewith shown and described is to be taken as a presently preferred embodiment. Various changes may be made in the shape, size and arrangement of parts. For example, equivalent elements may be substituted for those illustrated and described herein, parts may be reversed, and certain features of the invention may be utilized independently of the use of the other features, all without departing from the spirit or scope of the invention as defined in the subjoined claims.

What is claimed is:

1. An electromagnetic clutch comprising an output shaft rotatably supported within a casing, a tubular input shaft rotatably mounted on the output shaft with a bell-shaped end portion having a clutch face, and a clutch element having a generally cylindrical spring integrally connected to a disk at one end by a hub and having a magnetic ring mounted on the hub with one surface in abutment with the disk, said clutch element being connected to the output shaft at the end of the cylindrical spring so that the other surface of said magnetic ring forms a clutch-element clutch face adapted to contact the input-shaft clutch face, said spring having spaced rows of aligned circumferential slots formed therein with bridges separating the slots of each row.

2. An electromagnetic clutch comprising an output shaft rotatably supported within a casing, a tubular input shaft rotatably mounted on the output shaft with a bell-shaped end portion having a clutch face including a ring of non-magnetic material mounted between an inner and outer section of magnetic material, and a clutch element having a generally cylindrical spring integrally connected to a disk at one end by a hub and having a magnetic ring mounted on the hub with one surface in abutment with the disk, said clutch element being connected to the output shaft at the end of the cylindrical spring so that the other surface of said magnetic ring forms a clutch-element clutch face adapted to contact the input-shaft clutch face, said spring having spaced rows of aligned circumferential slots formed therein with bridges separating the slots of each row.

3. An electromagnetic clutch comprising an output shaft rotatably supported within a casing, a tubular input shaft rotatably mounted on the output shaft with a bell-shaped end portion having a clutch face including a ring of non-magnetic material mounted between an inner and outer section of magnetic material, and a clutch element having a generally cylindrical spring integrally connected to a disk at one end by a hub and having a magnetic ring mounted on the hub with one surface in abutment with the disk, said clutch element being connected to the output shaft at the end of the cylindrical spring so that the other surface of said magnetic ring forms a clutch-element clutch face adapted to contact the input-shaft clutch face, said integral spring, hub, and disk being made of copper and having its grain structure arranged in parallel fashion in a plane perpendicular to its axis, said spring having spaced rows of aligned circumferential slots formed therein with bridges separating the slots of each row.

4. An electromagnetic clutch-brake comprising an output shaft rotatably supported within a casing, a tubular input shaft rotatably mounted on the output shaft with a bell-shaped end portion having a clutch face including a ring of non-magnetic material mounted between an inner and outer section of magnetic material, a clutch element having a generally cylindrical spring integrally connected to a disk at one end by a hub and having a magnetic ring mounted on the hub with one surface in abutment with the disk, said clutch element being connected to the output shaft at the end of the cylindrical spring so that the other surface of said magnetic ring forms a clutch-element clutch face adapted to contact the input-shaft clutch face, said integral spring, hub, and disk being made of copper and having its grain structure arranged in parallel fashion in a plane perpendicular to its axis, said spring having spaced rows of aligned circumferential slots formed therein with bridges separating the slots of each row, with each bridge being isolated ninety degrees away from a bridge of an adjacent row, means for magnetically attracting the clutch faces so that they make contact with each other, a brake face formed on the non-abutting surface of the disk, and a brake face formed in the housing adapted to be frictionally engaged by the clutch-element brake face.

References Cited by the Examiner
UNITED STATES PATENTS

| | | |
|---|---|---|
| 2,171,185 | 8/1939 | Maier. |
| 2,401,003 | 5/1946 | Lear _____ 192—18.2 |
| 2,595,818 | 5/1952 | Smila _____ 64—30 |
| 3,052,335 | 9/1962 | Sulger _____ 192—18.2 X |

DON A. WAITE, *Primary Examiner.*

THOMAS J. HICKEY, DAVID J. WILLIAMOWSKY,
*Examiners.*